Feb. 24, 1959  SEIICHIRO MIZUI  2,874,558
PHOTOGRAPHIC FLASHLIGHT APPARATUS
Filed Nov. 16, 1955

INVENTOR.
SEIICHIRO MIZUI
BY
ATTORNEY

United States Patent Office 2,874,558
Patented Feb. 24, 1959

2,874,558

PHOTOGRAPHIC FLASHLIGHT APPARATUS

Seiichiro Mizui, Meguroku, Tokyo, Japan, assignor to Canon Camera Company, Inc., Otaku, Tokyo, Japan, a corporation of Japan Application November 16, 1955, Serial No. 547,279

Claims priority, application Japan November 17, 1954

4 Claims. (Cl. 67—31)

This invention relates to flashlight apparatus for photography by flash exposure and more particularly to auxiliary flashlight apparatus for connection to the main flashlight apparatus for multi-flashbulb synchronization.

A primary object of the instant invention is to prevent accidental firing of flashbulbs when connecting auxiliary flashbulb apparatus to the main flashbulb apparatus or while inserting the flashbulbs into any of the sockets therefor. Another object of this invention is to provide reliable charging of the capacitors of the firing circuits without permitting excessive currents to flow through the flashbulbs during the charging cycle.

Still a further object is to provide auxiliary flashbulb apparatus which is of compact shape and of light weight.

The foregoing objects and the features of the invention will more readily be understood from the following detailed description of an illustrative embodiment and a modification thereof in conjunction with the accompanying drawing, in which.

Figure 1:
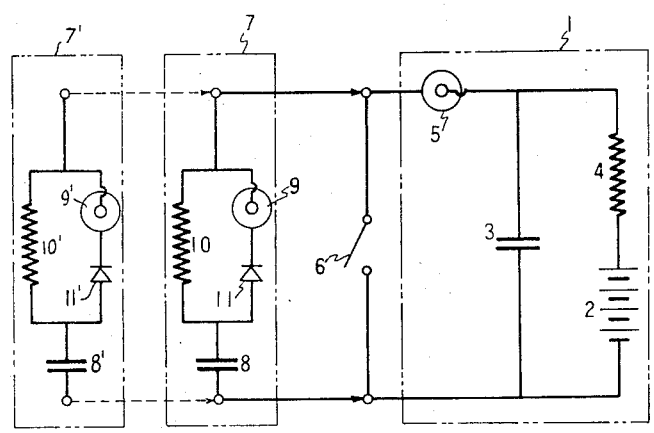
Figure 1 is the circuit diagram of one illustrative embodiment of the photographic flashbulb apparatus of my invention which eliminates any and all accidental firing of any flashbulb therein.

Referring to the drawing, the main flashbulb apparatus 1 is of the so-called "B–C" type, including a source of potential such as battery 2, capacitor 3, and resistor 4, serially connected to form the charging circuit, which is in shunt of the flashbulb socket 5 and the normally open ignition or firing switch 6. The auxiliary or subflashlight apparatus 7 of the instant invention is connected across the contacts of firing switch 6 of the main flashlight circuit, and comprises a flashbulb socket 9 in series with a rectifier 11 in shunt of a resistor 10, and a capacitor 8 of which one side is serially connected to the parallel branches of resistor 10, respectively socket 9 and rectifier 11, the other side of capacitor 8 being connected to the fixed contact of ignition switch 6. The resistor 10 functions as the charging resistor for capacitor 8 and prevents reverse charging of such capacitor by rectifier 11.

Obviously since rectifier 11 conducts somewhat in the reverse direction but for the presence of resistor 10, capacitor 8 would be charged by such reverse current and in the reverse direction even though the reverse current through rectifier 11 would be very weak and would take a long time to charge capacitor 8. Hence, charging the capacitor of the subflash apparatus by current in the reverse direction through a rectifier is impractical, and in the subflash apparatus according to the invention the capacitor 8 is charged from the battery 2 of the main flashing apparatus and resistance 10 is provided in parallel with the rectifier so that such charging current while in the reverse direction through the rectifier will pass readily by way of resistor 10 to capacitor 8. As shown in Figure 1, a second subflash apparatus 7' identical to subflash apparatus 7, or any reasonable plurality thereof, may be additionally connected in shunt of subflash apparatus 7 between the movable and fixed contacts of ignition switch 6.

When one or more subflash circuits 7, 7', . . . is connected across the contacts of open ignition switch 6, and a flashbulb is inserted in socket 5 of the main flash circuit, the presence of rectifier 11 in the subflash apparatus 7 prevents any accidental flashing, on inserting a flash bulb in socket 9 of the auxiliary flash apparatus, of the bulbs in sockets 5 and 9, such as might occur since a circuit is completed from battery 2, resistor 4, socket 5, resistor 10, capacitor 8 and back to battery 2, and the capacitor 8 is charged by the charge on capacitor 3 of the main flashbulb apparatus. With rectifier 11 present, however, and in series with socket 9 of the auxiliary flash apparatus, a polarity is given to the stated circuit permitting current flow in insufficient quantity to fire the inserted flashbulbs, only in the direction from capacitor 8 through the rectifier 11 to socket 9, thus isolating the flow of current from capacitor 3 to capacitor 8 and from socket 5 to socket 9. While in the prior art subflash apparatuses without a rectifier, a procedure involving connecting the main flash apparatus to a such prior art subflash apparatus without a flashbulb inserted in the socket of the subflash apparatus, and only after a period of waiting inserting a flashbulb in the subflash apparatus and finally in the mainflash apparatus, could be observed to avoid premature firing of the bulbs, the observance of such a strict sequence has been irksome and is entirely eliminated by the instant invention.

As has been stated above, any number of auxiliary flashbulb circuits according to the instant invention may be connected in parallel to the contacts of the mainflash apparatus ignition switch 6, or to corresponding terminals of other subflash apparatuses of this invention. When an auxiliary flashbulb device of this invention is so connected, the capacitor 3 of the main flashbulb apparatus initiates the charging of the capacitor 8, 8', . . . of the successive capacitors 8, 8', . . .; thus in the two auxiliary flashbulb devices 7 and 7' of Figure 1, capacitor 8 would be charged first and then capacitor 8'. It is to be noted that condenser 8' is charged with exactly the same effect when connected to the first subflash apparatus 7 as shown, as it would be if subflash 7' were connected directly across the contacts of ignition switch 6.

Figure 2:
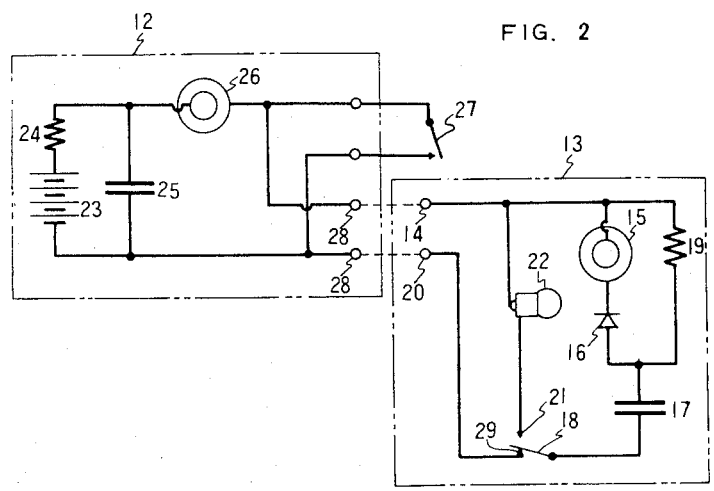
Figure 2 is a modification thereof which includes a test circuit.

In Figure 2, the main flashbulb apparatus 12 is shown connected to an auxiliary flashbulb device 13 according to the instant invention in which the auxiliary device is provided with a circuit to test whether flashbulbs, inserted in its socket, are in operative condition. The main flashing device 12 comprises battery 23, resistor 24 and capacitor 25 connected in series with a shunt circuit including flashbulb socket 26 and connections to the contacts of ignition switch 27 in the camera, which shunt circuit with capacitor 25 constitutes the firing circuit, for a flashbulb in socket 26. Resistor 24 is of such value as to prevent excessive current flow from the battery, particularly at the start of the charging of capacitor 25 of relatively low resistance, at which time but for resistor 24, the charging circuit would have little resistance, even when the subflash apparatus is connected to the mainflash apparatus. Similarly, since on firing, but for resistor 24, the only resistance in the firing circuit is that 0.5 ohm or so of the flashbulb, which would again cause excessive current flow. In view thereof, resistor 24 may be designated a safety resistor in that it is necessary for protection of the battery.

Figure 3:
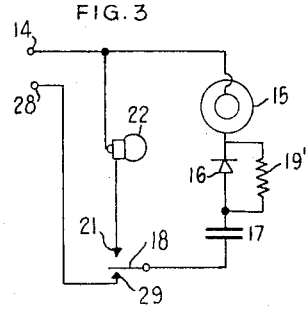
Figure 3 shows a portion of Figure 2 with an alternative arrangement of the shunting resistor relative to the rectifier and flashbulb socket of the auxiliary flashing circuit.

A pair of terminals 28, shunted across the firing switch connectors, is provided on the main flashbulb device for connection of the auxiliary flashbulb device. The auxiliary flashbulb apparatus 13 has a pair of terminals 14 and 20 connected to terminals 28 of the mainflash apparatus, terminal 14 being connected in series to flashbulb socket 15, selenium rectifier 16, and capacitor 17, the socket 15 and rectifier 16 being shunted by resistor 19. Resistor 19 is identical with, and serves the same functions as, resistors 10, 10' of Figure 1, and may be shunted about the rectifier 16 only as shown in Figure 3. When the resistor shunts only the rectifier, the firing circuit remains unaltered, while the charging circuit would then include the bulb in socket 15 in addition to resistor 19. In the alternative, the rectifier 16 might be designed to permit the flow of a suitable reverse current and serve as an alternative member for the resistor of the auxiliary flashlight circuit. Capacitor 17 in turn is connected to a change-over switch 18 of which the movable contact may selectively engage fixed contact 29, connected to terminal 20, or fixed contact 21, test lamp 22 being connected between contact 21 and terminal 14.

Normally the movable contact of switch 18 is closed on fixed contact 29 being spring-biased to close thereon, so that the circuit including capacitor 17 is constantly closed. Thus, on connection of terminals 14 and 20 to the respective ones of the terminal pair 28, the capacitor 17 will be charged from the mainflash apparatus, namely battery 23, resistor 24, flashbulb in socket 26, one terminal 28, terminal 14, resistor 19, capacitor 17, movable contact of switch 18 engaging fixed contact 29, terminal 20, the other terminal 28, and battery 23. A flashbulb in socket 15, and one in socket 26, may be tested by manually engaging the movable contact of switch 18 to fixed contact 21. If test lamp 22 lights up the particular bulb or bulbs are in working order. The bulbs will not flash as the current flowing is much too inadequate for the purpose. On release of the movable arm of switch 18 it restores the engagement between its movable contact and fixed contact 29. When the shutter of the camera is now depressed for making an exposure, ignition switch 27 closes and the bulbs in each socket are flashed through obvious circuits.

In the prior art subflash circuits, no such test circuit was possible due to the absence of the rectifier of the circuit of the instant invention.

What I claim is:

1. A multi-photoflash circuit comprising a main circuit consisting of a source of D. C. potential, a first resistor and a first capacitor in series, a first flashbulb socket connected to one side of the first capacitor, a normally open switch of which a first contact is connected to the first socket and the second contact to the other side of the first capacitor, and at least one auxiliary circuit connected between the first and second contacts of the switch, each auxiliary circuit including a second flashbulb socket, a rectifier and a second capacitor in series, and a second resistor of relatively high ohmic value in shunt of the rectifier, each rectifier being so poled as to prevent passage of sufficient current to flash flashbulbs in the first and second sockets until the switch is closed to interengage the first and second contacts.

2. An auxiliary photoflash circuit of the B-C type for connection in parallel to the ignition switch of a main photoflash circuit including a direct current source of potential, a resistor, a capacitor in series with the resistor and the potential source, and a flashbulb socket in series with the ignition switch in shunt of the capacitor, the auxiliary photoflash circuit comprising a second flashbulb socket, a rectifier and a second capacitor connected in series, and a second resistor of relatively high magnitude in shunt of at least the rectifier, the rectifier being poled as to prevent the passage of current sufficient to flash a flashbulb inserted into the second socket with the ignition switch open.

3. An auxiliary photoflash circuit according to claim 2 in which the second resistor is shunted across both the second flashbulb socket and the rectifier.

4. A multi-photoflash circuit comprising a main circuit including a source of D. C. potential, a first resistor and a first capacitor serially connected, a first flashbulb socket connected to one side of the first capacitor, a normally open switch of which a first terminal is connected to the first socket and the second terminal to the other side of the first capacitor, and at least one auxiliary circuit connected across the terminals of the switch, each auxiliary circuit including a second flashbulb socket, a rectifier, a second resistor of relatively high ohmic value in parallel to the second socket and rectifier, and a second capacitor in series, each rectifier being so poled as to prevent passage of current sufficient to flash flashbulbs in the first and second sockets until the switch is closed.

References Cited in the file of this patent

UNITED STATES PATENTS

| | | |
|---|---|---|
| 2,638,764 | Schwartz | May 19, 1953 |
| 2,730,885 | Kaprelian | Jan. 17, 1956 |

FOREIGN PATENTS

| | | |
|---|---|---|
| 897,800 | Germany | Nov. 23, 1953 |